Dec. 13, 1938. J. GOODMAN Re. 20,947

REFUSE TRUCK

Original Filed Sept. 26, 1931 3 Sheets-Sheet 1

INVENTOR
Joseph Goodman
BY
Zoltan A. Polachek
ATTORNEY

Dec. 13, 1938. J. GOODMAN Re. 20,947

REFUSE TRUCK

Original Filed Sept. 26, 1931 3 Sheets-Sheet 2

INVENTOR
Joseph Goodman
BY Zoltan G. Holechek
ATTORNEY

REFUSE TRUCK

Original Filed Sept. 26, 1931 3 Sheets-Sheet 3

INVENTOR
BY Joseph Goodman
Zoltan Polachek
ATTORNEY

Reissued Dec. 13, 1938 Re. 20,947

UNITED STATES PATENT OFFICE 20,947

REFUSE TRUCK

Joseph Goodman, New York, N. Y., assignor to Automatic Truck Loader Corporation, New York, N. Y., a corporation of Delaware Original No. 1,915,927, dated June 27, 1933, Serial No. 565,279, September 26, 1931. Application for reissue March 9, 1938, Serial No. 195,619

15 Claims. (Cl. 214—67)

This invention relates to new and useful improvements in a refuse truck.

The invention has for an object the construction of a refuse truck which is characterized by a body hinged at its back upon a chassis so as to be capable of tilting upwards to discharge its load, and the provision of a loading conveyor extending up the back of the truck and within the top of the body and arranged to automatically move as the truck is tilted to allow the discharge mentioned.

As another object of this invention it is proposed to construct the conveyor of two sections, the rear section of which is pivotally supported so as to be capable of swinging away from the back of the truck body.

As another object of this invention it is proposed to provide a pivotal frame engaging beneath the movable section of the conveyor and in connection with a cable anchored upon the chassis in a manner so as to complete pivoting of the conveyor section as the truck body is tilted.

As a still further object, it is proposed to provide a novel means for driving said conveyor operable only when the body is in its horizontal position.

A still further object of this invention is the construction of a device of the class mentioned which is of simple durable construction, dependable in use and efficient in action and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Figure 1:
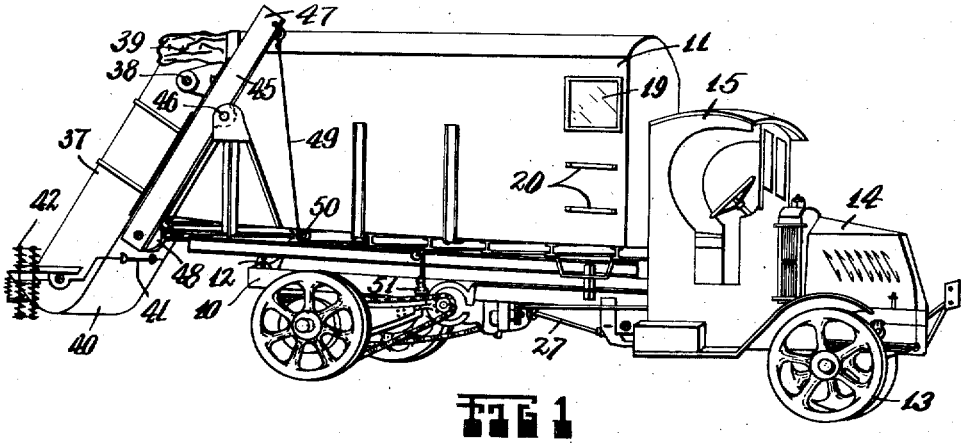
Fig. 1 is a perspective view of a refuse truck constructed according to this invention.

The refuse truck, according to this invention, is composed of a chassis 10 supporting a body 11. The chassis is of standard construction except for slight additions hereinafter stated specifically. The body 11 is pivotally mounted at 12 upon the back of the chassis so as to be capable of tilting upwards. The chassis is supported on wheels 13. At the front, a motor is within the hood 14. A driver's cabin is located immediately behind the hood. These parts have been briefly reviewed so that the main parts of the truck may be located. The body 11 is completely closed and at the back is formed with an inclined back side 16 which has an opening 17 normally closed by a cover. A window 18 at the side of the body permits inspection of the contents thereof from the exterior. Rungs 20 upon the sides of the body allow for climbing so that it is convenient to look through the windows 19.

Figure 2:
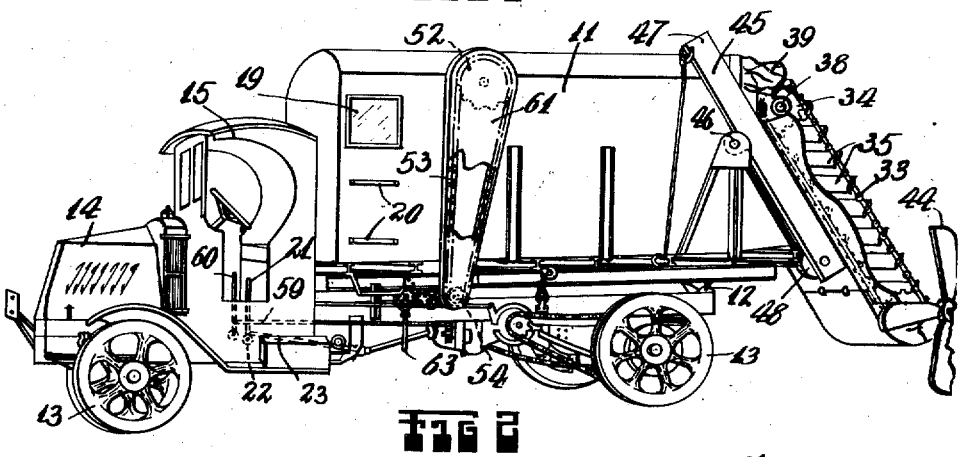
Fig. 2 is a perspective view of the truck shown in Fig. 1 but viewed from the other side.
Figure 10:
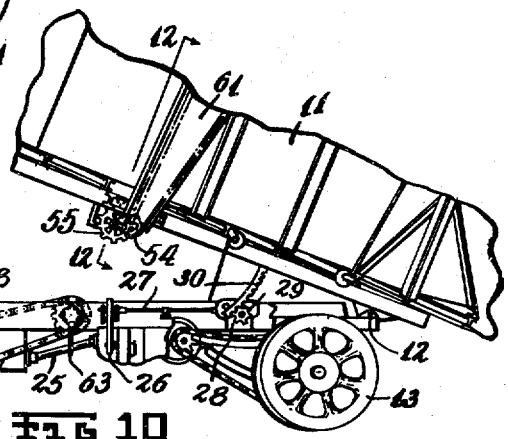
Fig. 10 is a fragmentary detailed view of a portion of Fig. 2 but showing the truck body inclined.
Figure 12:
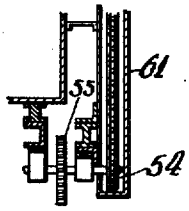
Fig. 12 is a sectional view taken on the line 12—12 of Fig. 10.
Figure 11:
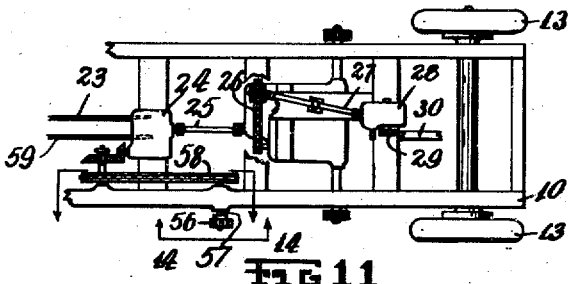
Fig. 11 is a fragmentary plan view of the chassis of the truck.

A means is provided for tilting the body upwards from its normal position, shown in Figs. 1 and 2, to a rest position as indicated in Fig. 10. This means comprises a control lever 21 within the driver's cabin 15 and pivotally supported at the bottom end 22, this control lever is in connection with a rod 23 working a shift 24 supported on the chassis. The details of the shift 24 are not shown since its construction is generally known to those skilled in the art and it forms no part of this invention. The shift 24 controls a transmission system 25 which includes a sprocket drive 26, a shaft 27, a reduction unit 28 and terminates in a drive pinion 29. This drive pinion is in mesh with an arcuate rack 30 attached upon the bottom of the body.

Figure 3:
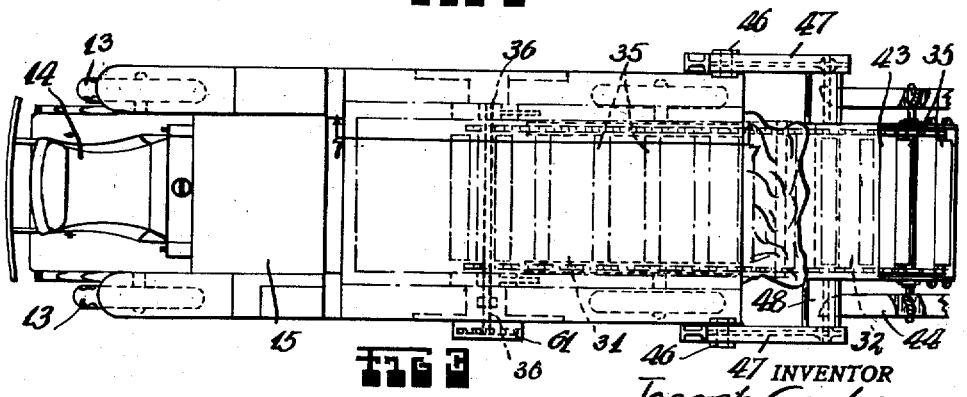
Fig. 3 is a plan view of Fig. 2.
Figure 4:
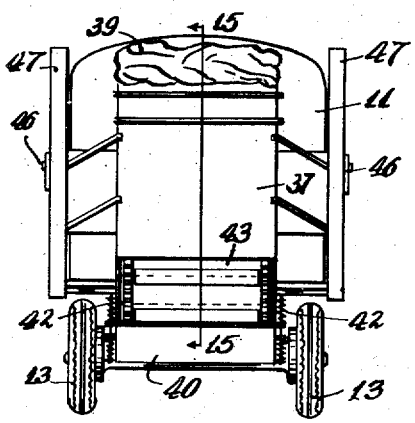
Fig. 4 is a rear elevational view of Fig. 1.
Figure 9:
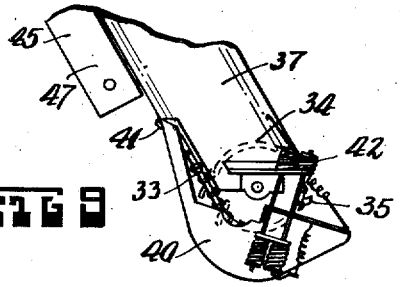
Fig. 9 is a fragmentary elevational view of the lower portion of the conveyor showing the intake spout in a strained or opened position.
Figure 15:
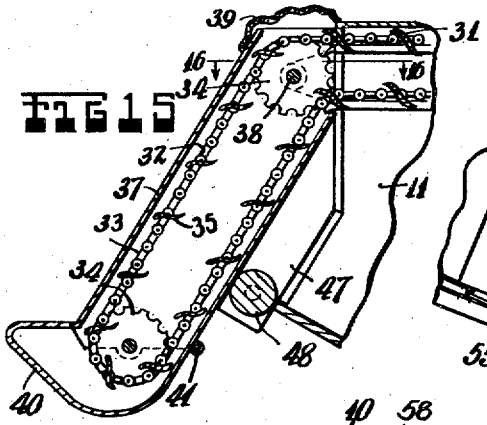
Fig. 15 is a fragmentary sectional view taken on the line 15—15 of Fig. 4.

A conveyor 31 is extended within the top of the body 11 and has a portion projecting from the rear of the body which inclines downwards at an angle to the vertical. This back portion of the conveyor is indicated by reference numeral 32. The conveyor is formed by endless chains 33 extended over wheels 34 and carrying conveyor blades 35. One of the sprocket wheels 34 is mounted upon an adjustable journal 36 so that the tension of the conveyor may be adjusted properly. The section 32 of the conveyor is mounted within a casing 37 pivotally supported at the top at the point 38 upon the rear of the body 11. Flexible material 39 is extended between the top of the casing 37 and the body so as to allow pivoting of the conveyor section. At the lower end, the casing 37 is provided with a moveable bottom 40 forming an intake spout, or boot, which is hingedly supported at one side 41 and resiliently held closed at the other side to prevent jamming of the conveyor by a bolt and spring construction, 42. In Fig. 9 the section 40 is shown pivoted to an opened position with the spring compressed. A portion of the casing 37 is opened, indicated in Figs. 3 and 4 by reference numeral 43, so that the conveyor may be properly loaded. In the event that too much material collects within the hinged portion 40, instead of the conveyor jamming, the portion 40 will merely move under its resilient holding means. When the refuse truck is used on snow, blades 44 are mounted upon the bottom of the conveyor for the purpose of breaking up the snow so that it may be easily lifted by the conveyor.

A frame 45 is pivotally mounted intermediately at 46 upon the body 11. This frame comprises side members 47 jointed by a roller 48 which is extended beneath the conveyor casing 37. The top ends of the side members 47 are connected with cables 49 extended over pulleys 50 mounted upon the bottom of the body 11 and attached at their bottom ends to the chassis 10 as indicated at 51.

Figure 13:
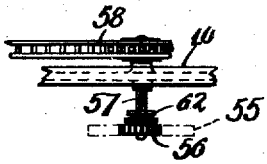
Fig. 13 is a fragmentary enlarged detailed view of a portion of Fig. 11 showing in particular the drive for the conveyor.
Figure 14:
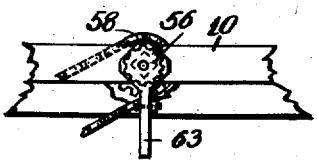
Fig. 14 is an elevational view looking in the direction of the line 14—14 of Fig. 11.
Figure 16:
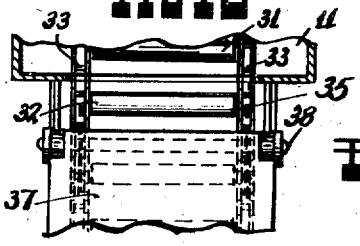
Fig. 16 is a fragmentary sectional view taken on the line 16—16 of Fig. 15.

A sprocket 54 is fixed upon a rotatively mounted shaft on the body 11 which carries a gear 55. When the body 11 is in a lowered position, the gear 55 meshes with a gear 56 slidable on a squared shaft 57 rotatively mounted in the side piece of chassis 10 (Fig. 13). The squared shaft 57 connected with a transmission system 58 terminates in the shift 24. A control rod 59 is adapted to operate the shift so as to cause the transmission to move. The control rod 59 connects with a hand lever 60 in the cabin 15 of the vehicle. A casing 61 (Fig. 2) houses the chain 53 connecting the sprocket wheels 52 and 54. The gear 56 is provided with a collar 62 from which a handle 63 (Figs. 2, 10 and 14) depends so that the gear may be moved along the squared shaft 57 to be in mesh or out of mesh with the gear 55.

Figure 6:
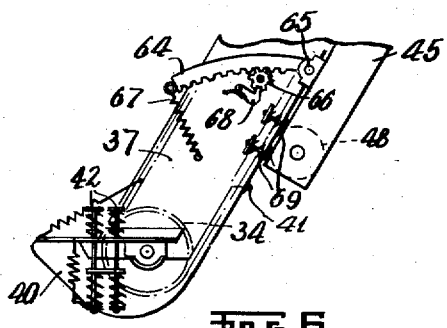
Fig. 6 is a fragmentary side elevational view of the lower portion of the conveyor for use of the invention but constructed in modified form.
Figure 7:
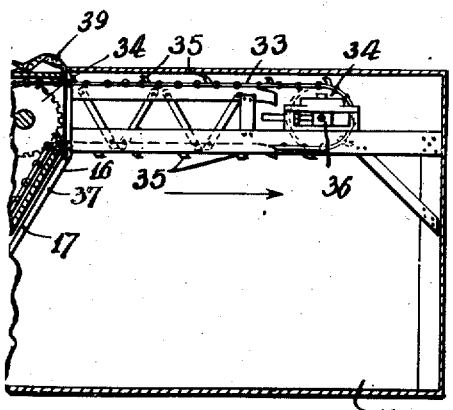
Fig. 7 is a fragmentary longitudinal sectional view of the truck body.

The modification shown in Fig. 6 discloses means for rigidly holding the conveyor casing 37 at various distances from the frame 45. This is accomplished by an arcuate rack 64 pivotally supported at one end 65 upon the frame 45 and in mesh with a pinion 66 rotative upon the casing 37. A spring 67 acting between the rack and the casing 37 urges the rack into engagement with the gear 66. A spring urged pawl 68 is mounted upon the casing 37 and engages the gear 66 so as to hold it in fixed positions. A bumper 69 is arranged upon the side of the casing 36 and acts against the frame 45 to cushion any shocks which may result by the conveyor casing 37 engaging against the frame. To change the relative positions of the frame 45 to the conveyor casing 37, the pawl 68 must first be disengaged from the gear 66 which latter element must be turned to cause the rack 64 to move thereby changing the relative positions between the frame and the casing, and then the pawl 68 must be re-engaged with the gear 66 so as to hold the parts in desired separated positions.

In loading the truck the operation of the parts may be traced by assuming them to be in the position as shown in full lines in Fig. 1. Refuse may be dumped into the inlet spout 40 and be fed up by the blades 35 of the conveyor. It is requisite that the conveyor work in an anti-clockwise direction so that the blades scoop up material from within the bottom of the casing section 37, lift this material up and drop the material over into the top of the truck body 11. As the material piles up, the blades 35 will also serve to spread the material out towards the front and sides of the truck body.

Figure 5:
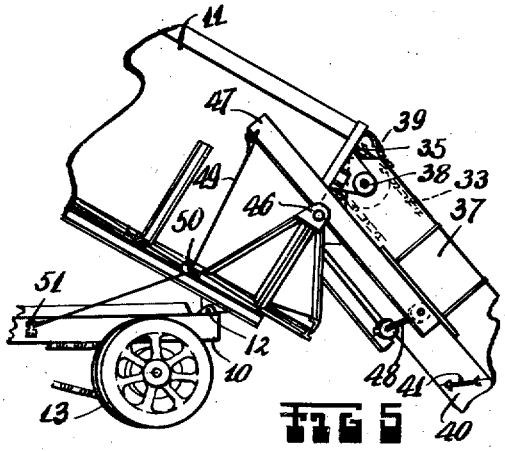
Fig. 5 is a fragmentary view similar to the rear portion of Fig. 2 but showing the truck inclined so as to be capable of discharging its load.
Figure 8:
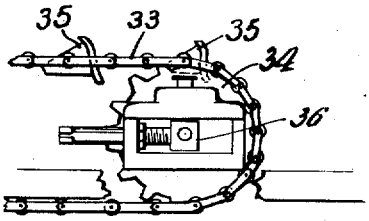
Fig. 8 is a fragmentary enlarged detailed view of the conveyor sprocket and conveyor shown in Fig. 7.

In the unloading operation the body 11 is raised to the tilted position, as shown for example in Fig. 10, the conveyor casing 37 will be automatically moved away from the back of the body so that refuse within the body can be discharged through the opening 17 in the rear end of the body. In Fig. 5, the condition of the device is shown in which the conveyor section is moved away from the body. It should be noted that as the body 11 assumes the tilted position the top ends of the frame 45 will be drawn downwards relatively to the body which causes lifting of the back portion of the conveyor, indicated by 32, and its casing 37.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A refuse truck, comprising a chassis, a body hinged at its back end upon said chassis and having an inclined back side with an opening, means for raising said body to an inclined position, a conveyor within the top of the body and having a section extending from the back of the body and down along the back, a pivotal frame on said body beneath the back section of said conveyor and slidably supporting the back section of the conveyor, means for driving said conveyor when said body is in a lowered position, and means for changing the inclination of said frame to lift the conveyor section automatically as the body is raised.

2. A refuse truck, comprising a chassis, a body hinged at its back end upon said chassis and having an inclined back side with an opening, means for raising said body to an inclined position, a conveyor within the top of the body and having a section extending from the back of the body and down along the back, a pivotal frame on said body slidably supporting the back section of said conveyor, means for driving said conveyor when said body is in a lowered position, and means for changing the inclination of said frame to lift the conveyor section automatically as the body is raised, said means for raising the body being controlled from a hand lever within the driver's cabin of said truck.

3. A refuse truck, comprising a chassis, a body hinged at its back end upon said chassis and having an inclined back side with an opening, means for raising said body to an inclined position, a conveyor within the top of the body and having a section extending from the back of the body and down along the back, a pivotal frame on said body slidably supporting the back section of said conveyor, means for driving said conveyor when said body is in a lowered position, and means for changing the inclination of said frame to lift the conveyor section automatically as the body is raised, said conveyor comprising endless chains extended over sprockets and supporting blades.

4. A refuse truck, comprising a chassis, a body hinged at its back end upon said chassis and having an inclined back side with an opening, means for raising said body to an inclined position, a conveyor within the top of the body and having a section extending from the back of the body and down along the back, a pivotal frame on said body slidably supporting the back section of said conveyor, means for driving said conveyor when said body is in a lowered position, and means for changing the inclination of said frame to lift the conveyor section automatically as the body is raised, the back of said conveyor section being within a conveyor casing pivotally mounted at its top end upon the back of said body.

5. A refuse truck, comprising a chassis, a body hinged at its back end upon said chassis and having an inclined back side with an opening, means for raising said body to an inclined position, a conveyor within the top of the body and having a section extending from the back of the body and down along the back, a pivotal frame on said body slidably supporting the back section of said conveyor, means for driving said conveyor when said body is in a lowered position, and means for changing the inclination of said frame to lift the conveyor section automatically as the body is raised, the back of said conveyor section being within a conveyor casing pivotally mounted at its top end upon the back of said body, flexible material being engaged over the back of the body and the top of said conveyor casing to close the opening between these parts.

6. A refuse truck, comprising a chassis, a body hinged at its back end upon said chassis and having an inclined back side with an opening, means for raising said body to an inclined position, a conveyor within the top of the body and having a section extending from the back of the body and down along the back, a pivotal frame on said body slidably supporting the back section of said conveyor, means for driving said conveyor when said body is in a lowered position, and means for changing the inclination of said frame to lift the conveyor section automatically as the body is raised, said pivotal side members supporting a transverse roller engaged beneath the conveyor section.

7. A refuse truck, comprising a chassis, a body hinged at its back end upon said chassis and having an inclined back side with an opening, means for raising said body to an inclined position, a conveyor within the top of the body and having a section extending from the back of the body and down along the back, a pivotal frame on said body slidably supporting the back section of said conveyor, means for driving said conveyor when said body is in a lowered position, and means for changing the inclination of said frame to lift the conveyor section automatically as the body is raised, said pivotal frame being pivoted intermediate of its end upon the back of said body.

8. A refuse truck, comprising a chassis, a body hinged at its back end upon said chassis and having an inclined back side with an opening, means for raising said body to an inclined position, a conveyor within the top of the body and having a section extending from the back of the body and down along the back, a pivotal frame on said body slidably supporting the back section of said conveyor, means for driving said conveyor when said body is in a lowered position, and means for changing the inclination of said frame to lift the conveyor section automatically as the body is raised, said means for driving the conveyor comprises a drive system on said body and terminating in a gear engageable with a gear from a drive system on said chassis.

9. A refuse truck, comprising a chassis, a body hinged at its back end upon said chassis and having an inclined back side with an opening, means for raising said body to an inclined position, a conveyor within the top of the body and having a section extending from the back of the body and down along the back, a pivotal frame on said body slidably supporting the back section of said conveyor, means for driving said conveyor when said body is in a lowered position, and means for changing the inclination of said frame to lift the conveyor section automatically as the body is raised, said means for driving the conveyor comprises a drive system on said body and terminating in a gear engageable with a gear from a drive system on said chassis, the drive system on said chassis including a transmission terminating in a control lever within the cabin of said truck.

10. A refuse truck, comprising a chassis, a body hinged at its back end upon said chassis and having an inclined back side with an opening, means for raising said body to an inclined position, a conveyor within the top of the body and having a section extending from the back of the body and down along the back, a pivotal frame on said body slidably supporting the back section of said conveyor, means for driving said conveyor when said body is in a lowered position, and means for changing the inclination of said frame to lift the conveyor section automatically as the body is raised, comprising a cable attached upon the top end of said frame and extending over pulleys upon said body and attached upon said chassis.

11. A refuse truck, comprising a chassis, a body hinged at its back end upon said chassis and having an inclined back side with an opening, means for raising said body to an inclined position, a conveyor within the top of the body and having a section extending from the back of the body and down along the back, a pivotal frame on said body slidably supporting the back section of said conveyor, means for driving said conveyor when said body is in a lowered position, and means for changing the inclination of said frame to lift the conveyor section automatically as the body is raised, the bottom of the conveyor section being formed with a resilient attached member.

12. A refuse truck, comprising a chassis, a body hinged at its back end upon said chassis and having an inclined back side with an opening, means for raising said body to an inclined position, a conveyor within the top of the body and having a section extending from the back of the body and down along the back, a pivotal frame on said body slidably supporting the back section of said conveyor, means for driving said conveyor when said body is in a lowered position, means for changing the inclination of said frame to lift the conveyor section automatically as the body is raised, and means for rigidly holding the back conveyor section at various distances from said pivotal frame.

13. A refuse truck, comprising a truck body having an open rear end and adapted to tilt to dump from the rear end, a hinged cover, extending over said open rear end for closing the same, a loading conveyor mounted on said cover, said loading conveyor continuing over the top of said truck body for loading same, the rear portion of said conveyor being pivoted relative to the top portion, and means for pivoting said rear conveyor section together with the hinged cover, away from the rear open end of the truck body, and at the lower end at the rear of said truck the loading conveyor is provided with a loading boot, having a section resiliently supported to be capable of moving out of position in the event of overloading of the conveyor, a plurality of conveying blades or buckets projecting from said conveyor, means for moving the conveyor blades so that they scoop the refuse in said boot upward at the side adjacent the said hinged door, then dumping the refuse from the top of the refuse truck at its rear end first and as the refuse fills up the rear end of the truck body, the moving conveying blades or buckets act as scrapers to level the loaded refuse below the top of the truck body and thereafter to carry the excess refuse toward the front adjacent the levelled surface.

14. In a refuse truck, the combination with a box forming a truck body, a conveyor extending over the top of the body and depending downwardly on the outside of the body comprising means for picking up and carrying refuse from a point at its lower end and depositing it into the top of the body, of a casing enclosing the depending portion of the conveyor comprising a movable bottom end portion forming a hopper and means for resiliently supporting said end portion for movement relatively to the conveyor to relieve tension on the latter occurring in the vicinity of its pick-up.

15. In a refuse truck, the combination with a box forming a truck body having an open side and a door for closing the opening, a conveyor extending over the top of the body and downwardly on the outer side of the door, means for moving the conveyor to transport material upwardly on the side adjacent the door and deposit it into the body contiguous to the upper edge of the door, of a boot forming a movable hopper enclosing the lower end of the conveyor and devices for yieldingly holding the hopper adjacent the conveyor and allowing it to move to relieve pressure created by the engagement of refuse by the conveyor in its movement through the hopper.

JOSEPH GOODMAN.